(12) United States Patent
Yamada et al.

(10) Patent No.: US 8,290,700 B2
(45) Date of Patent: Oct. 16, 2012

(54) PLANNING APPARATUS

(75) Inventors: Kazunao Yamada, Toyota (JP); Yusuke Mizuno, Anjo (JP); Tadashi Sakai, Obu (JP)

(73) Assignee: Denso Corporation, Kariya (JP)

( * ) Notice: Subject to any disclaimer, the term of this patent is extended or adjusted under 35 U.S.C. 154(b) by 412 days.

(21) Appl. No.: 12/653,123

(22) Filed: Dec. 8, 2009

(65) Prior Publication Data

US 2010/0152939 A1    Jun. 17, 2010

(30) Foreign Application Priority Data

Dec. 11, 2008   (JP) ................. 2008-315598

(51) Int. Cl.
*G01C 21/34* (2006.01)
*G08G 1/0696* (2006.01)

(52) U.S. Cl. ........ 701/410; 701/22; 701/425; 180/65.29

(58) Field of Classification Search ............ 701/410, 701/411, 418, 421, 425, 428, 22, 33.4; 180/65.29
See application file for complete search history.

(56) References Cited

U.S. PATENT DOCUMENTS

| | | | |
|---|---|---|---|
| 6,314,347 B1 | 11/2001 | Kuroda et al. | |
| 7,761,203 B2 * | 7/2010 | Yamada | 701/33.4 |
| 7,849,944 B2 * | 12/2010 | DeVault | 180/65.29 |
| 2001/0044693 A1 * | 11/2001 | Gotou et al. | 701/202 |
| 2009/0326750 A1 * | 12/2009 | Ang | 701/22 |

FOREIGN PATENT DOCUMENTS

| | | |
|---|---|---|
| JP | 2000-333305 | 11/2000 |
| JP | 2001-183150 | 7/2001 |
| JP | 2005-91112 | 4/2005 |

OTHER PUBLICATIONS

Office action dated Aug. 31, 2010 in corresponding Japanese Application No. 2008-315598.

* cited by examiner

*Primary Examiner* — Tan Q Nguyen
(74) *Attorney, Agent, or Firm* — Harness, Dickey

(57) ABSTRACT

A planning apparatus for use in a hybrid vehicle specifies a plan section for the purpose of creating a travel plan, and stores the plan section in a durable storage medium. The medium-stored plan section is then presented for an occupant of the vehicle, for the purpose of confirmation. The stored plan section may be modified according to an intention of the occupant, thereby enabling the occupant's intention to be reflected to the plan section. Then, the plan section reflecting the occupant's intention is used to create a travel plan of the hybrid vehicle.

12 Claims, 11 Drawing Sheets

FIG. 3A
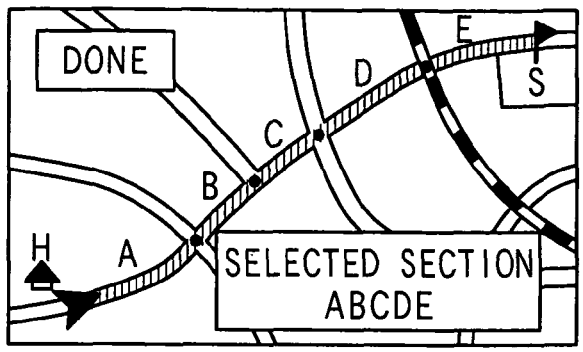
FIG. 3B
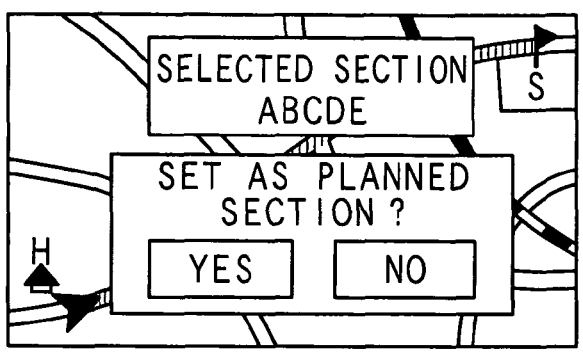
FIG. 3C
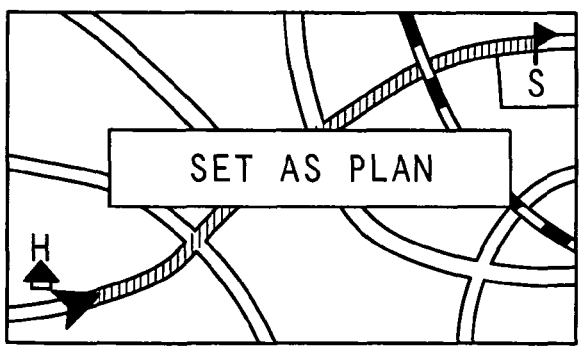
FIG. 4
| DATE | START | ID | DEST |
|---|---|---|---|
| 2008/10/22/13:30 | (x1, y1) | ABCDE | (x2, y2) |

FIG. 6A
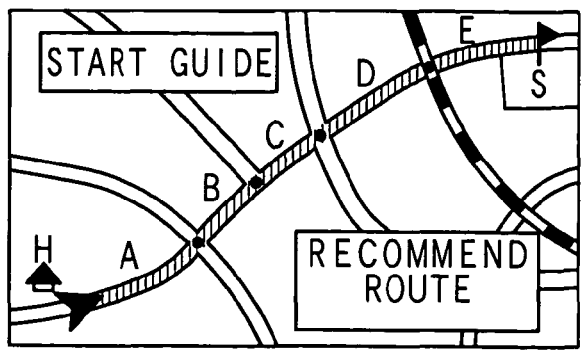
FIG. 6B
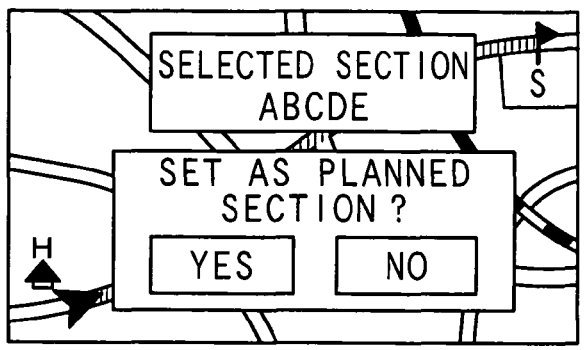
FIG. 6C
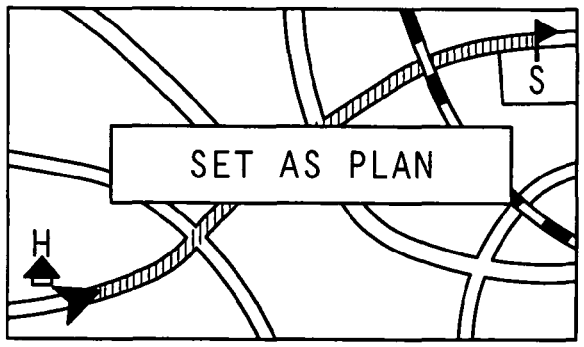
FIG. 7
| DATE | START | ID | DEST |
|---|---|---|---|
| 2008/10/22/13:30 | (x1, y1) | ABCDE | (x2, y2) |

FIG. 10A
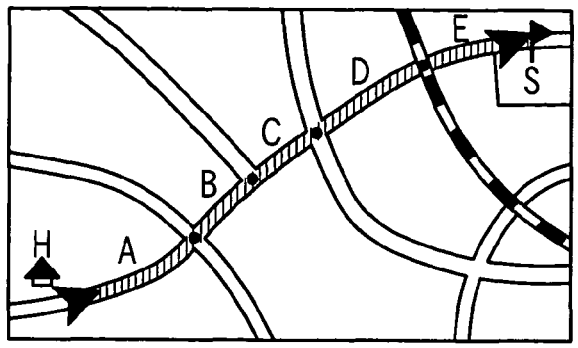
FIG. 10B
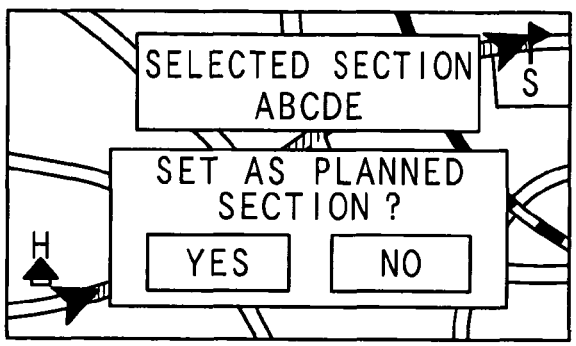
FIG. 10C
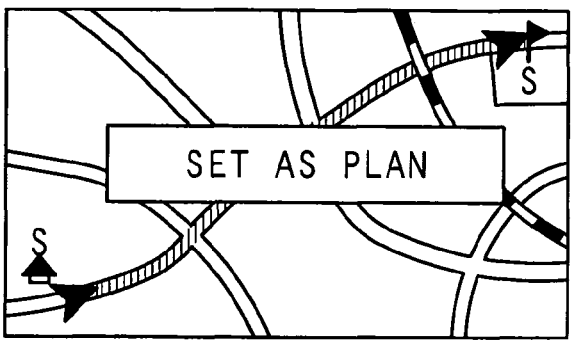
FIG. 11
| DATE | START | ID | DEST |
|---|---|---|---|
| 2008/10/22/13:30 | (x1, y1) | ABCDE | (x2, y2) |

FIG. 14A
| DATE | START | ID | DEST |
|---|---|---|---|
| 2008/10/22/13:30 | (x1, y1) | ABCDE | (x2, y2) |
| . | . | . | . |
| . | . | . | . |
FIG. 14B
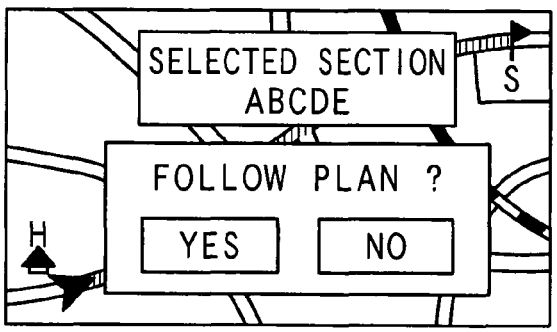
FIG. 15
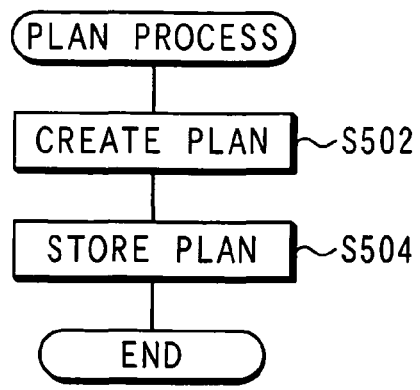

# PLANNING APPARATUS

CROSS REFERENCE TO RELATED APPLICATION

The present application is based on and claims the benefit of priority of Japanese Patent Application No. 2008-315598, filed on Dec. 11, 2008, the disclosure of which is incorporated herein by reference.

FIELD OF THE INVENTION

The present disclosure generally relates to a travel plan apparatus that creates a travel plan of a hybrid vehicle for facilitating a vehicle's travel that utilizes both of an internal combustion engine and a motor as a power source of travel.

BACKGROUND INFORMATION

Conventionally, the hybrid vehicle utilizing both of an internal combustion engine and a motor as its power source for driving the vehicle is equipped with an apparatus that reduces the fuel consumption of the engine by (a) planning a schedule of driving the engine and the motor according to the route condition of a guidance route extending from the departure place to the destination and (b) controlling the engine and the motor according to the schedule of driving of the engine and the motor. Such an apparatus is disclosed, for example, in Japanese patent documents JP-A-2000-333305 (now available as U.S. Pat. No. 6,314,347) and JP-A-2001-183150.

According to the disclosure in those patent documents, plan section setting for setting certain road sections as a travel plan of the vehicle is performed in the following fashion. That is, when a guidance route between the departure place and the destination is searched for, the searched route is set as a "plan section" of the travel plan of the vehicle. When the vehicle is used for commuting or the like, the frequently-traveled route is recorded by the navigation apparatus in association with the time of actual travel (i.e., commuting), and the recorded travel route is used as the plan section of the travel plan of the vehicle's travel in the frequently-traveled time slot, assuming that the vehicle will follow the frequently-traveled route of the recorded travel.

However, in the above-described fashion, an expected travel plan intended by an occupant of the vehicle is not necessarily reflected to the plan section of the travel plan set by the apparatus. Further, once set, the plan section in the created travel plan cannot be changed/modified by the occupant. As a result, the vehicle's travel controlled by the conventional planning apparatus could not have achieved, in some cases, an expected target value of fuel consumption, due to the plan section of the travel plan that is solely made up by the planning apparatus, but not intended by the occupant.

SUMMARY OF THE INVENTION

In view of the above and other problems, the present disclosure provides a planning apparatus that provides a freedom of plan setting for setting a travel plan with its plan section set/specified according to occupant/user intention, for the purpose of creating an appropriate travel plan for controlling a hybrid vehicle.

In an aspect of the present disclosure, the planning apparatus for creating a travel plan of a hybrid vehicle that uses an internal combustion engine and a motor as a driving power source and performs control on how to use the internal combustion engine and the motor according to the created travel plan includes: a plan section storage for specifying and storing a plan section of the travel plan in a storage medium; a travel route presenter for presenting the plan sections stored in the storage medium and for allowing an occupant of the hybrid vehicle to specify an expected travel route of occupant choice; and a travel plan creator for creating the travel plan by, according to an operation of the occupant, employing the expected travel route of occupant choice as the plan section.

In the configuration described above, the plan section of the travel plan is specified and stored in a memory, and the stored plan section is presented for the occupant (e.g., a driver of the vehicle) for confirmation of his/her intention, or for modification of the presented plan section according to occupant's intention. In this fashion, the plan section of the travel plan is specified and set according to the operation (i.e., a confirmation operation, a modification operation or the like) by the occupant, thereby enabling a creation of the travel plan that reflects the occupant's intention.

BRIEF DESCRIPTION OF THE DRAWINGS

Objects, features, and advantages of the present disclosure will become more apparent from the following detailed description made with reference to the accompanying drawings, in which:

FIGS. 3A to 3C are illustrations of a screen used in the plan section storage process 1 in the embodiment;

FIG. 4 is a table of data of a selected route section stored in a durable storage medium in the embodiment;

FIGS. 6A to 6C are illustrations of a screen used in the plan section storage process 2 in the embodiment;

FIG. 7 is another table of data of a selected route section stored in a durable storage medium in the embodiment;

FIGS. 10A to 10C are illustrations of a screen used in the plan section storage process 3 in the embodiment;

FIG. 11 is yet another table of data of a selected route section stored in a durable storage medium in the embodiment;

FIGS. 14A and 14B are illustrations of a screen used in the travel plan formulate process in the embodiment;

FIG. 15 is a flowchart of a portion of the travel plan create process in the embodiment;

DETAILED DESCRIPTION

Figure 1:
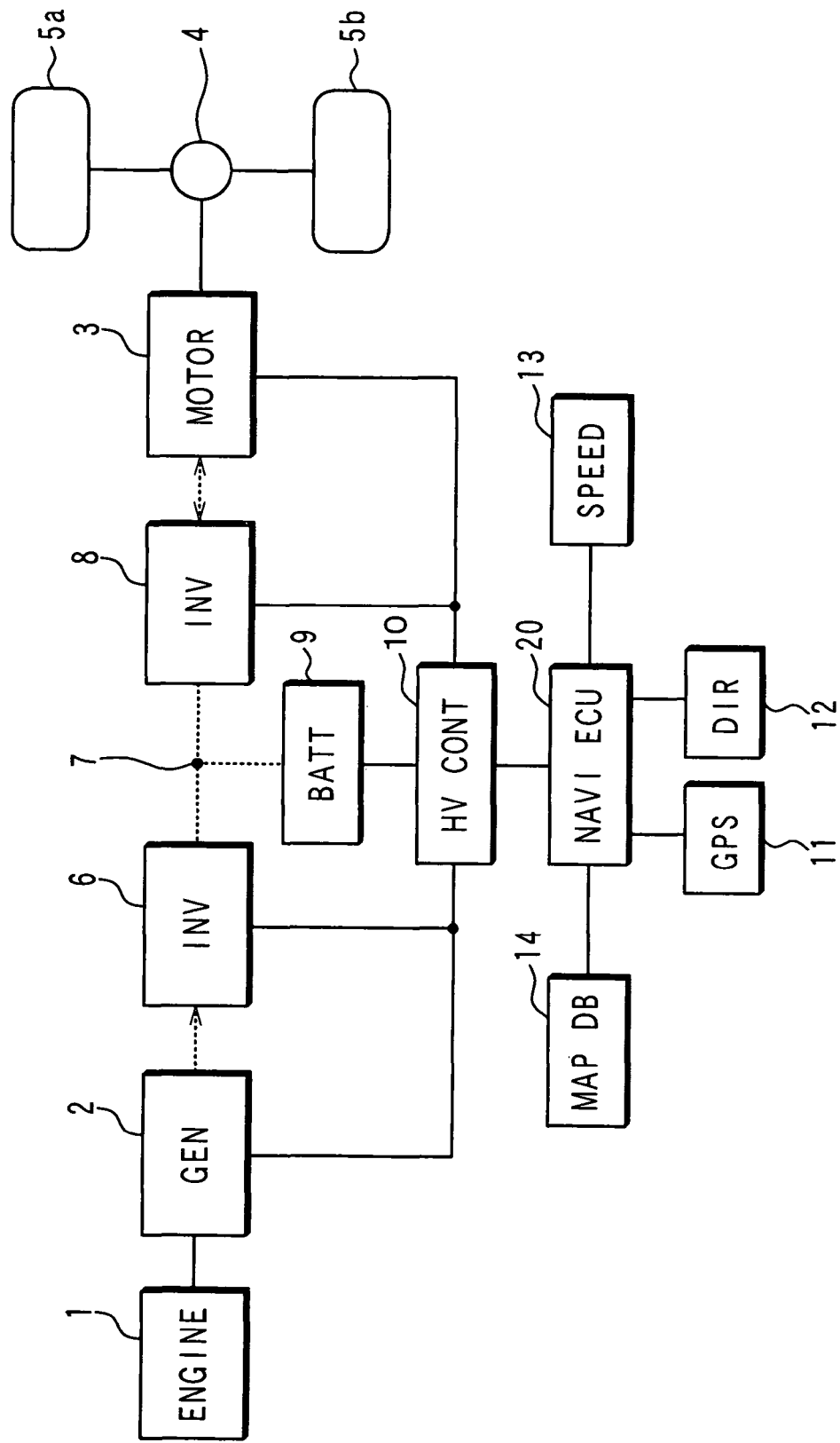
FIG. 1 is a configuration of a drive control unit of a hybrid vehicle in an embodiment of the present disclosure.

Hereinafter, the present invention is described as an embodiment and its modifications. FIG. 1 shows a block diagram of a drive control apparatus of a hybrid vehicle in an embodiment of the present disclosure. The hybrid vehicle includes an internal combustion engine 1, a generator 2, a motor 3, a differential device 4, a tire 5a, a tire 5b, an inverter 6, a DC link 7, an inverter 8, a battery 9, an HV controller 10, a GPS sensor 11, a direction sensor 12, a speed sensor 13, a map DB storage 14, and a navigation ECU 20.

The hybrid vehicle travels by using the engine 1 and the motor 3 as its power source. When the engine 1 is used as a power source, the rotation force of the engine 1 is transmitted to the tires 5a and 5b through the clutch mechanism (not shown in the drawing) and the differential device 4. When the motor 3 is used as a power source, the direct current electric power of the battery 9 is converted into the alternating current electric power by the DC link 7 and the inverter 8, and the motor 3 is driven by the alternating current electric power to transmit the rotation force from the motor 3 to the tires 5a and 5b through the differential device 4. Hereinafter, the travel mode of the hybrid vehicle is designated either as an engine-powered travel or a motor-assisted travel depending on the power source. That is, when the vehicle is traveling on the power of the engine 1, the vehicle is in the engine-powered travel mode, and when the vehicle is traveling on the power of at least the motor 3 from among the two power sources of the engine 1 and the motor 3, the vehicle is in the motor-assisted travel mode.

Further, the rotation force of the engine 1 is also transmitted to the generator 2 to generate the alternating current electric power, and the generated alternating current electric power is converted into the direct current electric power by the inverter 6 and the DC link 7. The direct current electric power is stored and accumulated in the battery 9. In this case, the charging of the battery 9 is the charging by the operation of the engine 1 which consumes fuel. Hereinafter, the charging of the electric power by the generator 2 which is driven by the rotation force of the engine 1 is designated as an internal-combustion charging.

Further, at the time of braking of the hybrid vehicle, the resistance force from the tires 5a, 5b is utilized to drive the motor 3, thereby generating the alternating current electric power that is to be converted into the direct current electric power by the inverter 8 and the DC link 7, and that is to be stored and accumulated in the battery 9. Hereinafter, the charging by using the motor 3 at the time of braking is designated as re-generation charging.

The HV controller 10 controls, according to the instructions from the navigation ECU 20 as well as other instructions, execution and non-execution of an operation of apparatus such as the generator 2, the motor 3, the inverter 6, the inverter 8, the battery 9 and the like as described above. The HV controller 10 may, for example, be realized by a microcomputer, or other hardware of dedicated circuitry for the functions described in the following.

More practically, the HV controller 10 stores two values, that is, a current SOC and a standard SOC, and performs two processes, that is, a process A and a process B.

(Process A)

The HV controller 10 changes the standard SOC value based on an input of a target control value (a target SOC) from the navigation ECU 20, which serves as a control index, and controls actuators on the generator 2, the motor 3, the inverters 6, 8, the battery 9, and the like for controlling the charge amount of the battery 9 in the hybrid vehicle closer to the target SOC.

(Process B)

The HV controller 10 periodically notifies the navigation ECU 20 of the current SOC.

In the above description, SOC means "State Of Charge" that serves as an index of a battery charge amount, or a remaining power in the battery. The higher the value of the SOC is, the greater the remaining amount of the battery becomes. Thus, the current SOC represents the SOC value currently remaining in the battery 9. The HV controller 10 repeatedly updates the current SOC value by detecting a battery condition time after time. The standard SOC is used as the target control value that allows the HV controller 10 to determine which of the electric power generation or the motor-assisted travel is to be performed. The standard SOC value may, for example, be determined as 60%. The standard SOC value may be changed under control of the navigation ECU 20.

The HV controller 10 switches the travel mode of the hybrid vehicle based on the target control value input from the navigation ECU 20. That is, whether to perform the engine-powered travel or the motor-assisted travel is determined based on the target control value from the ECU 20. Further, the controller 10 switches the execution/non-execution of the internal combustion charging, and the execution/non-execution of the re-generation charging, based on the target control value. That is, in other words, the HV controller 10 determines the travel mode of the hybrid vehicle and performs actuator control based on the determined travel mode, for the purpose of maintaining the current SOC to have a value that is in the proximity of the target SOC.

The GPS sensor 11, the direction sensor 12 and the speed sensor 13 are well-known sensors for detecting the position, the travel direction and the travel speed of the hybrid vehicle. The map DB storage 14 is a storage medium for storing map data. The map data includes node data to represent each of the multiple intersections and link data to represent each of the multiple links, that is, road section connecting two intersections. An entry of the node data includes an ID number, position information, and type information of the relevant node. An entry of the link data includes an ID number (i.e., a link ID), position information, road type information and the like of the relevant link.

In addition, a display unit (not illustrated) as well as an operation unit (not illustrated) is connected to the navigation ECU 20. The operation unit has touch switches formed on a display screen of the display unit and/or mechanical switches surrounding the display screen of the display unit. Those switches of the operation unit output operation signals according to an operation by an occupant of the vehicle.

The navigation ECU 20 is implemented as a computer having a RAM, a ROM, a durable storage medium on which data is writable, and a CPU (not illustrated). The durable storage medium is a storage medium which can retain data even when the supply of the main electrical power for the navigation ECU 20 is stopped. For example, a nonvolatile memory medium such as a hard disk, a flash memory, an EEPROM or the like as well as a back-up RAM may serve as the durable storage medium.

The CPU in the navigation ECU 20 carries out various processes according to a program stored in the ROM or the durable storage medium. As the processes carried out by the navigation ECU 20, the following processes are observed. That is, for example, (a) a map matching process, that determines to which road in the map of the map DB storage 14 the current vehicle position corresponds to, based on position information acquired from the GPS sensor 11, the direction sensor 12, and the speed sensor 13, (b) a route calculation process that determines an optimum route to a destination that is specified by using the operation unit (not illustrated) by the user, (c) a route guidance process that provides directions along the calculated optimum route, and (d) a travel information storage process that samples travel information at a regular travel distance and stores it to the durable storage medium for creating a travel plan during the travel of the vehicle, are performed among other processes.

Further, the navigation ECU 20 in the present embodiment performs (e) a plan section storage process 1 that registers, as a plan section, user-specified travel sections specified from a map on the screen by an occupant of the vehicle, (f) a plan section storage process 2 that registers, as the plan section, the optimum route calculated by the route calculation process, (g) a plan section storage process 3 that registers, as the plan section, a travel locus of the vehicle collected during the travel of the vehicle, (h) a travel plan creation process that presents to the occupant the plan section stored in the durable storage medium and creates a travel plan by adopting a user-specified expected travel route as the plan section, (i) a notification process that notifies the occupant of the exit of the vehicle from the plan section or of the entrance into the plan section according to the travel of the vehicle, and (j) an HV control process that drives the engine and the motor according to a travel plan stored in the durable storage medium. The details of those processes are described in the following.

Figure 2:
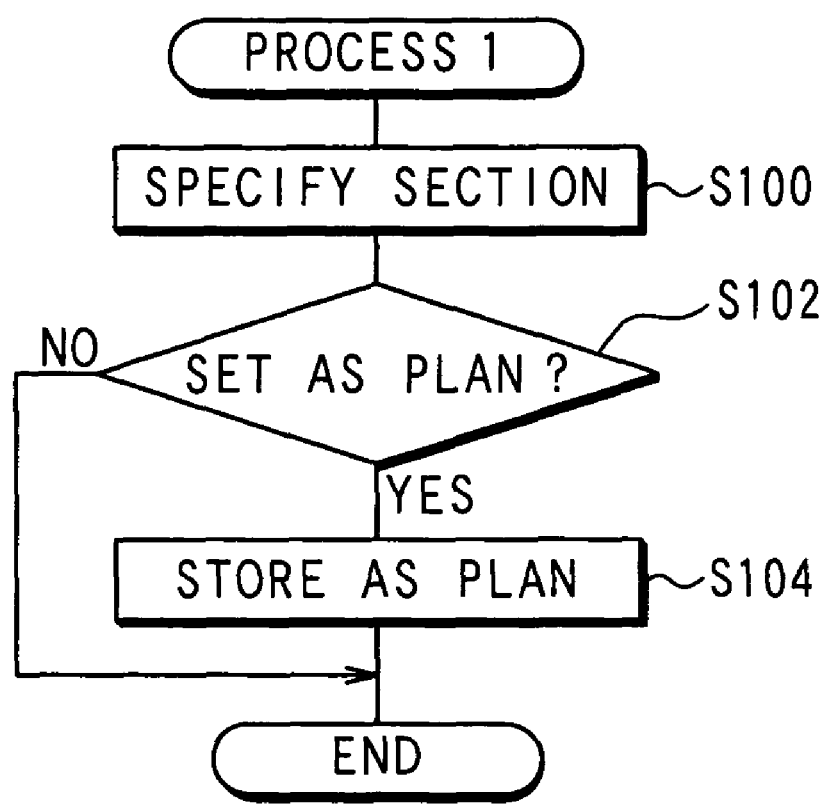
FIG. 2 is a flowchart of a plan section storage process 1 in the embodiment.

According to FIG. 2, the plan section storage process 1 is explained first. When a start of the plan section storage process 1 is instructed from a menu screen by the occupant, the navigation ECU 20 carries out the process shown in FIG. 2.

First, the process allows the occupant to specify a plan section (S100). More practically, as shown in FIG. 3A, a map is displayed on the screen, and the occupant is prompted to select and specify the plan section. This process allows the occupant to specify road sections, section by section, on the map. The selected sections are registered as the plan section. The operation to specify a certain road section on the map is configured to change the selection status of the relevant road section cyclically.

After specifying the intended sections on the map by the unit of a link, for example, the occupant presses a "DONE" button. That is, after selecting sections A to E as selection for the plan section, the user presses the "DONE" button.

Then, the process determines setting of the plan section (S102). That is, more practically, a confirmation screen is displayed on the display unit as shown in FIG. 3B, and inquires of the occupant about the setting of the selected sections as the plan section (denoted as "SET AS PLANNED SECTION?" in the example of FIG. 3B).

If YES is selected by the occupant in S102, the selected sections of A to E are set as the plan section and are stored in the durable storage medium in S104, and a confirmation message is shown on the screen as shown in FIG. 3C. In this manner, data including a registration date, a departure place (e.g., coordinates of a departure place), a route ID, a destination (e.g., coordinates of a destination) is recorded in the durable storage medium as shown in FIG. 4. In this case, the route ID is, for example, recorded and registered as a series of links that are respectively identified by an identifier such as a link ID or the like, for example.

If NO is selected in the screen by the occupant in S102, the process 1 is concluded without recording the selected sections as the plan section in the durable storage medium.

Figure 5:
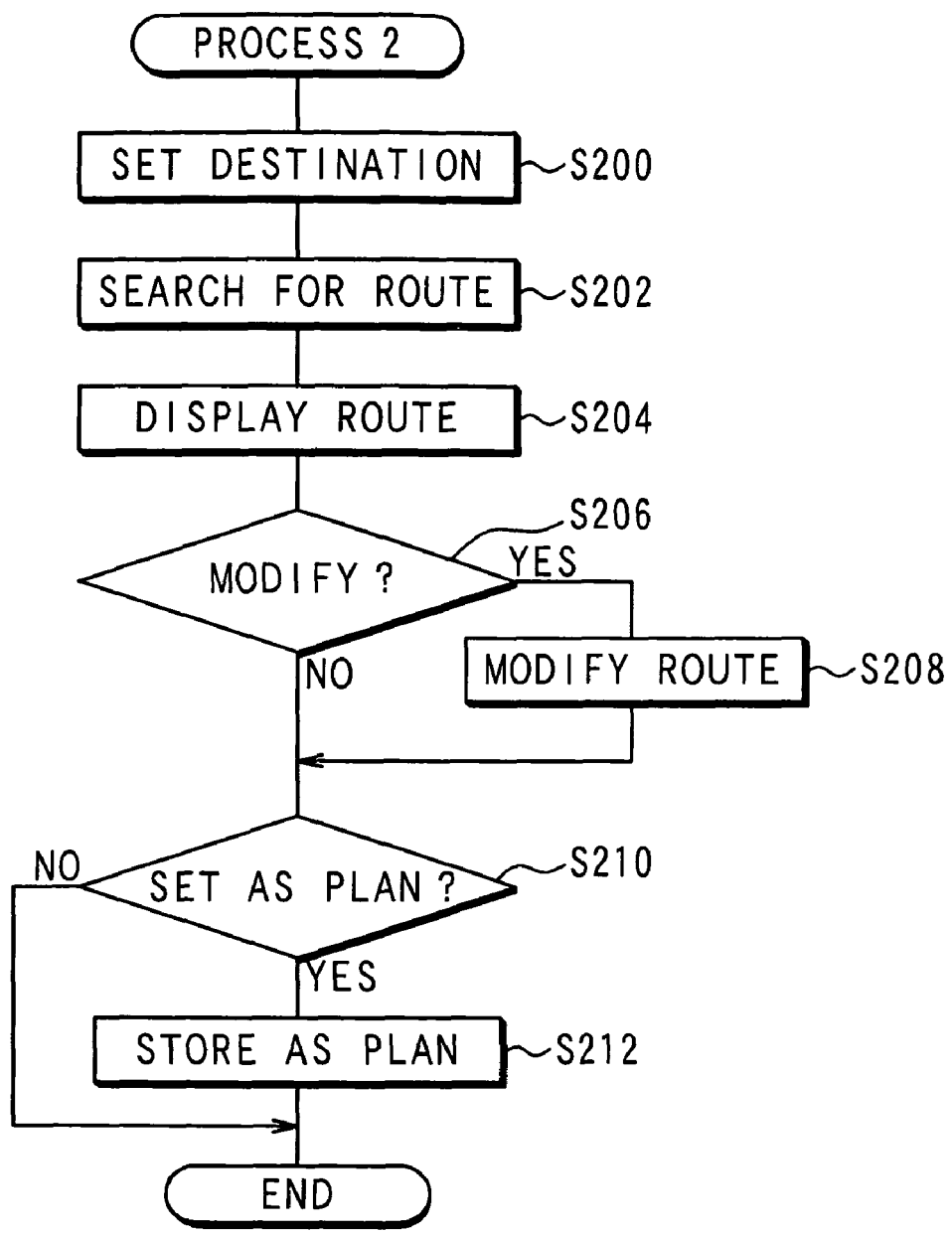
FIG. 5 is a flowchart of a plan section storage process 2 in the embodiment.

According to FIG. 5, the plan section storage process 2 is explained next. When a start of the plan section storage process 2 is instructed according to a menu screen by the occupant, the navigation ECU 20 carries out the process shown in FIG. 5.

First, the destination is set (S200). More practically, a screen for setting a destination is displayed on the display unit, and a destination search and the like is performed according to user operation, and a place/facility identified as a destination by the operation of the occupant is set as the destination.

Then, a guidance route search is carried out (S202). The guidance route search searches for an optimum route from the departure place to the destination. In this case, the current vehicle position may be used as the departure place of the route, or a place different from the current vehicle position may be used as the departure place according to the user operation.

Then, the optimum route is displayed on the screen (S204). FIG. 6A shows an example of the optimum route displayed on the screen. The route (denoted as "RECOMMEND ROUTE" in FIG. 6A) is shown as selected sections A to E on the map, together with a button "START GUIDE" that instructs a start of the route guidance process. Pressing the "START GUIDE" button starts the route guidance process.

Then, whether or not to modify the route is determined (S206). More practically, a screen showing an inquiry message "MODIFY (ROUTE)?" together with YES/NO options for user choice is displayed.

When the occupant selects YES in S206, the route is modified (S208). More practically, a route modification screen is displayed, which modifies at least one of the departure place and the destination by allowing the occupant to select each of the road sections in the map by a unit of road section, and after modification, the process proceeds to S210.

If the occupants selects NO in S206, the process proceeds to S210 without route modification.

In S210, whether or not to set the selected route sections as the plan section is determined. More practically, a confirmation screen is displayed on the display unit as shown in FIG. 6B, and inquires of the occupant about the setting of the selected sections as the plan section (denoted as "SET AS PLANNED SECTION?" in the example of FIG. 6B).

If YES is selected by the occupant in S210, the selected sections of A to E are recorded as the plan section and are stored in the durable storage medium in S212, and a confirmation message is shown on the screen as shown in FIG. 6C. In this manner, data including a registration date, a departure place (e.g., coordinates of a departure place), a route ID, a destination (e.g., coordinates of a destination) is recorded in the durable storage medium as shown in FIG. 7, for example.

Figure 8:
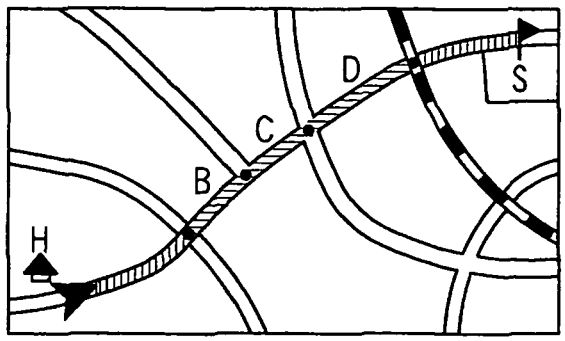
FIG. 8 is an illustration of a screen for an explanation of plan section storage process 2 in the embodiment.

If, on the other hand, the guidance route has been modified in S208, that is, for example, the guidance route has been modified from sections A to E to sections B to D as shown in FIG. 8, the sections B to D are stored in the durable storage medium as the plan section.

Therefore, as described above, both of the searched route and the modified route that is can be stored in the durable storage medium as the plan section. The plan section designated as a "singular" section suggests that the plan section already made up of multiple selected road sections may further be combined with other road sections, in many different contexts, to form one "route" as a travel plan.

If NO is selected in the screen by the occupant in S210, the process is concluded without recording the selected sections as the plan section in the durable storage medium.

Figure 9:
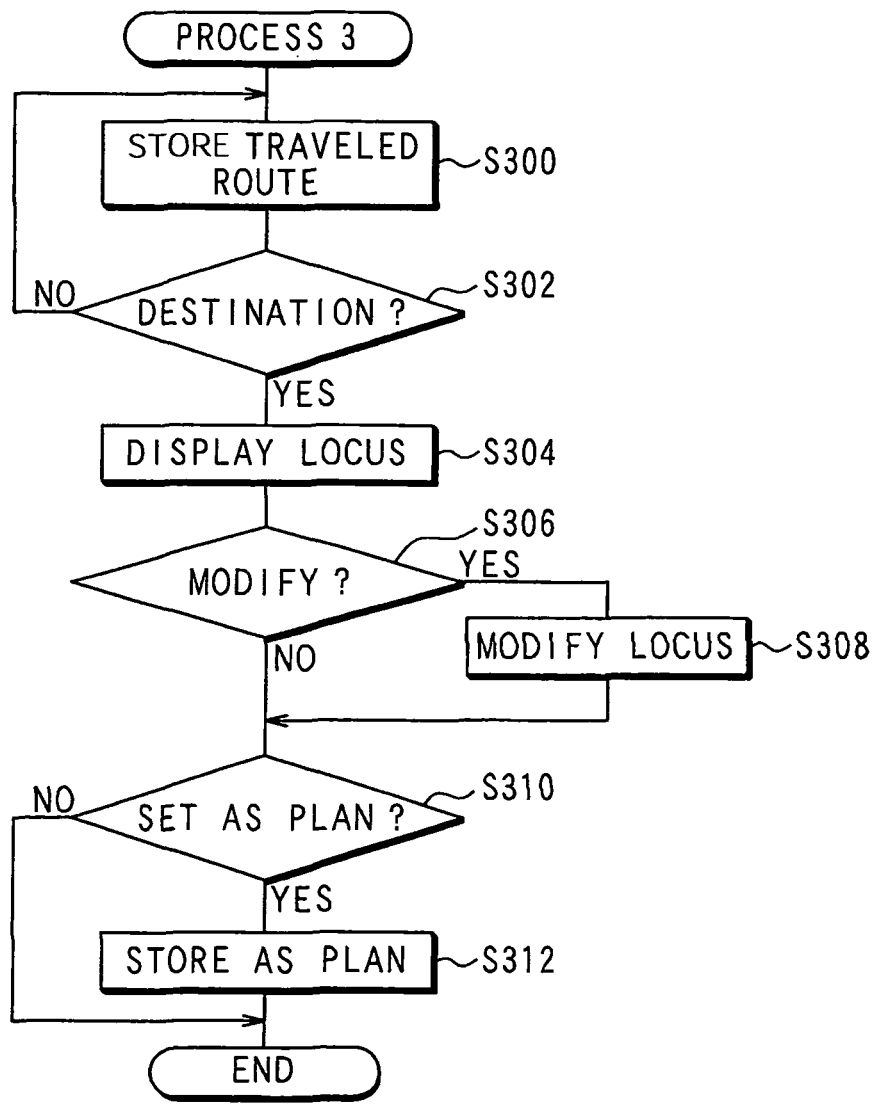
FIG. 9 is a flowchart of a plan section storage process 3 in the embodiment.

According to FIG. 9, the plan section storage process 3 is explained next. When a start of the plan section storage process 3 is instructed according to a menu screen by the occupant, the navigation ECU 20 carries out the process shown in FIG. 9.

First, a traveled route, or, more practically, a travel locus traveled by the vehicle is stored (S300). In this case, for each of predetermined sections, the current vehicle position is identified and recorded in the RAM, and the road section currently traveled by the vehicle is also identified and recorded in the RAM.

Then, whether or not the destination has been reached is determined next (S302). In the present embodiment, a signal showing use of the parking brake is used for determination of destination-reached condition. Alternatively, the destination-reached condition may be determined based on a signal showing a shift position being put into Parking or the like.

Until the vehicle reaches the destination, the above determination in S302 is repeated as negative (i.e., NO), and thus the collection of the travel locus in S300 is continued for accumulating the travel locus in the durable storage medium.

Then, the determination result of S302 turns to YES at the destination, thereby proceeding to S304 for the display of the travel locus. FIG. 10A shows a screen that displays the collected travel locus. In this case, sections A to E are shown on the map as the selected route sections derived from the collection of travel locus.

Then, whether or not to modify the travel locus is determined (S306). More practically, a screen showing an inquiry message "MODIFY (LOCUS)?" together with YES/NO options for user choice is displayed.

When the occupant selects YES in S306, the travel locus is modified (S308). More practically, a locus modification screen is displayed, which modifies at least one of the departure place and the destination by allowing the occupant to select each of the road sections in the map by a unit of road section, and after modification, the process proceeds to S310.

If the occupants selects NO in S306, the process proceeds to S310 without locus modification.

In S310, whether or not to set the selected route sections as the plan section is determined. More practically, a confirmation screen is displayed on the display unit as shown in FIG. 10B, and inquires of the occupant about the setting of the selected sections as the plan section (denoted as "SET AS PLANNED SECTION" in the example of FIG. 10B).

If YES is selected by the occupant in S310, the selected sections of A to E are recorded as the plan section and are stored in the durable storage medium in S312, and a confirmation message is shown on the screen as shown in FIG. 10C. In this manner, data including a registration date, a departure place (e.g., coordinates of a departure place), a route ID, a destination (e.g., coordinates of a destination) is recorded in the durable storage medium as shown in FIG. 11, for example.

Figure 12:
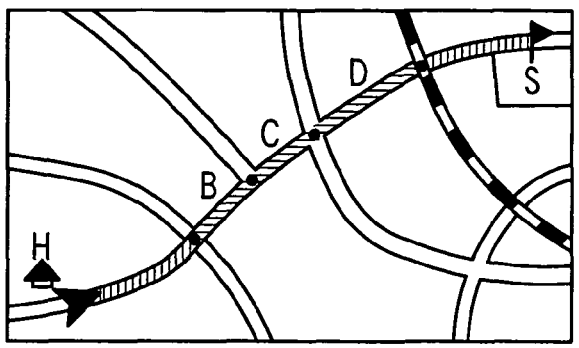
FIG. 12 is an illustration of a screen for an explanation of plan section storage process 3 in the embodiment.

If, on the other hand, the travel locus has been modified in S308, that is, for example, the travel locus has been modified from sections A to E to sections B to D as shown in FIG. 12, the sections B to D are stored in the durable storage medium as the plan section.

In summary, the travel plan having the plan section is stored in the durable storage medium by the plan section storage processes 1 to 3 as mentioned above.

According to FIG. 13, the travel plan creation process is explained next. When a start of the travel plan creation process is instructed according to a menu screen by the occupant, the navigation ECU 20 carries out the process shown in FIG. 13. In addition, it is assumed that, prior to the start of the travel plan creation process, the plan section of the travel plan is stored in the durable storage medium by either of the plan section storage processes 1 to 3.

In the travel plan creation process, the destination is set at first (S400). Same as S200 in FIG. 5, a screen for setting a destination is displayed on the display unit, and a destination search and the like is performed according to user operation, and a place/facility identified as a destination by the operation of the occupant is set as the destination.

Then, a guidance route search is carried out next (S402). Same as S202 in FIG. 5, the optimum route from the departure place to the destination is searched for as the guidance route.

Then, it is determined next whether or not the guidance route is registered as the plan section (S404). More practically, based on whether or not the same section as the searched guidance route is stored as the plan section in the durable storage medium, the registration of the guidance route is determined.

When the same section as the guidance route is stored in the durable storage medium as the plan section, the determination in S404 becomes YES, and the process proceeds to S406.

If, on the other hand, the same section as the guidance route is not stored in the durable storage medium as the plan section, the determination in S404 becomes NO, and the plan section storage process 2 is carried out next (S405). That is, steps S204 to S212 in FIG. 5 are carried out as the storage process. More practically, the guidance route having been searched for in S402 is processed in the same manner as steps S204 to S212 in FIG. 5, before proceeding to S406.

In S406, the plan section stored in the durable storage medium is displayed for the occupant. More practically, plan sections having the departure place identical to the current vehicle position may be extracted from the guidance routes stored in the durable storage medium for display, or all plan sections stored in the durable storage may be displayed. In FIG. 14A, the multiple plan sections are displayed on the screen in a list form, for example.

Then, whether or not to travel the plan section is determined next (S408). More practically, after a selection of a plan section by the occupant, a confirmation screen shown in FIG. 14B is displayed for inquiring of the occupant about the travel of the selected plan section (denoted as "FOLLOW PLAN?" in the example of FIG. 14B). That is, whether one of multiple plan candidates displayed on the map is identical with an expected route intended by the occupant is determined.

If YES is selected by the occupant in S408, the process proceeds to the travel plan creation process (S500). In this case, the travel plan creation process creates a travel plan based on the selected plan section.

If NO is selected by the occupant in S408, the process proceeds to S412 to modify the plan section displayed on the screen. More practically, by displaying a screen that allows the occupant to select a section from among all component sections in the plan section, the desired new plan section is determined by the occupant. That is, by selecting and de-selecting the existing sections, section by section, the occupant can modify at least one of the departure place and the destination of the plan section, prior to proceeding to S500. In this case, the travel plan creation process creates a travel plan based on the modified plan section.

FIG. 15 shows a flowchart of the travel plan creation process (S500). The travel plan creation process first creates a plan in S502. More practically, total energy required for the travel of the plan section is calculated, based on the information stored in the durable storage medium. Then, how the vehicle should be driven is determined based on the information stored in the medium, for each of road section IDs. That is, for example, after the standard SOC is acquired from the HV controller 10, the driving method such as selection of the engine-powered travel and the motor-assisted travel, whether or not to perform the internal combustion charging, whether or not to perform the re-generation is determined for each of the road section IDs, based on the calculation of electric power generation efficiency and assisted travel efficiency, in combination with the acquired standard SOC and the travel information of the plan section collected by the actual travel of the vehicle between the departure place and the destination, which is stored for the durable storage medium. Then, the SOC management plan (equivalent to the travel plan) for the entire plan section is created based on the travel information stored in the durable storage medium. The SOC management plan is an expected change (i.e., transition) of target SOC (i.e., a targeted control value) along the travel route toward the destination. The creation of the SOC management plan is well-known from, for example, a Japanese patent document JP-A-2001-183150, or "Development of new energy vehicle" from CMC publication on pages 123 to 124, for example.

Figure 13:
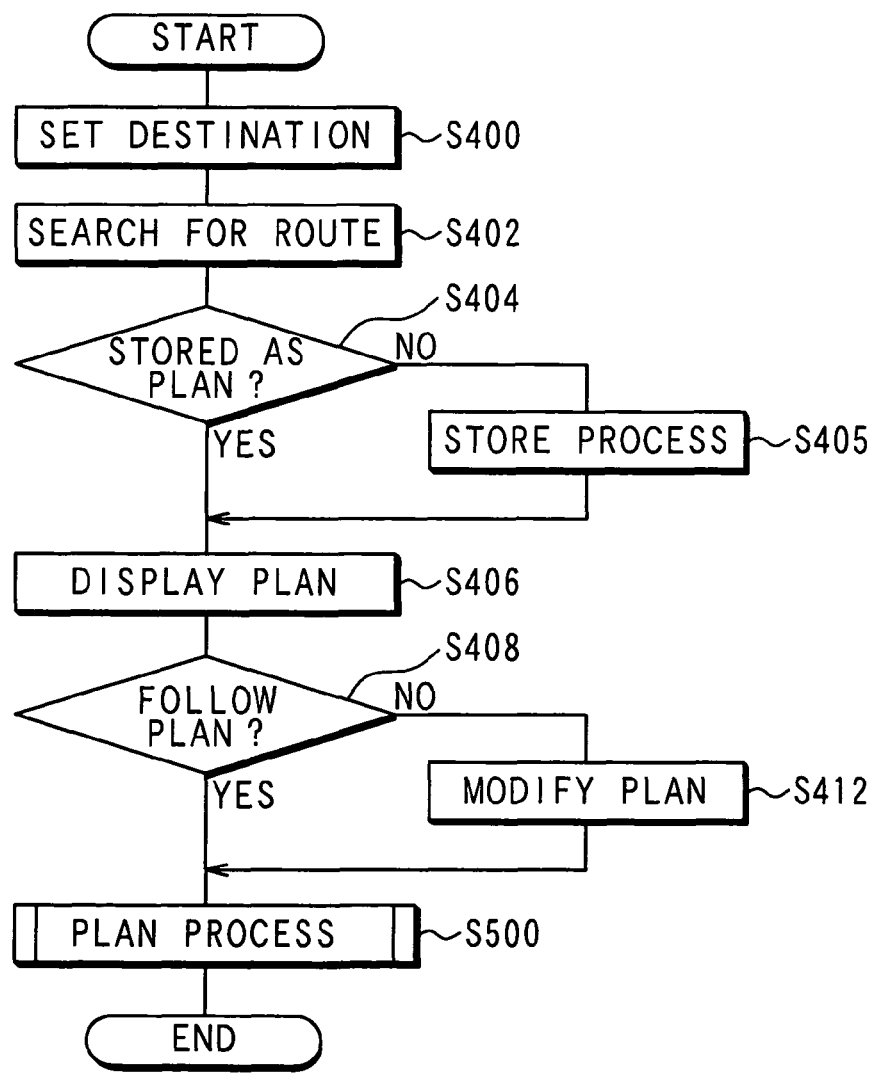
FIG. 13 is a flowchart of a travel plan create process in the embodiment.

Then, the created SOC management plan is stored in the durable storage medium (S502), and the process shown in FIGS. 13 and 15 is concluded.

In this manner, the travel plan has the plan section that is specified as the user-specified expected travel route according to the user operation is stored in the durable storage medium.

Figure 16:
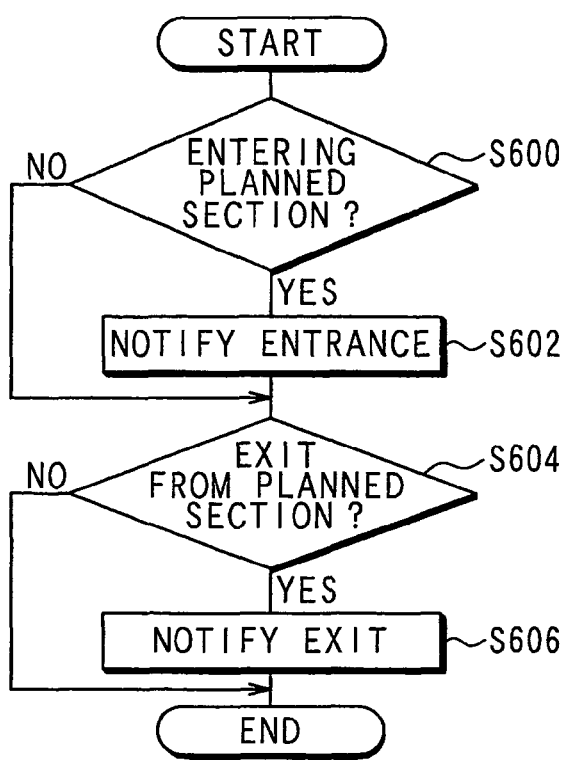
FIG. 16 is a flowchart of a notification process in the embodiment.

According to FIG. 16, the notification process is explained next. The notification process is repeatedly carried out in parallel with the HV control process that is to be mentioned later.

First, it is determined whether the vehicle has entered the plan section from outside of the plan section (S600). More practically, the current determination result is compared with a previous determination result, for determining whether or not the current vehicle position comes to an inside of the plan section.

Figure 17A:
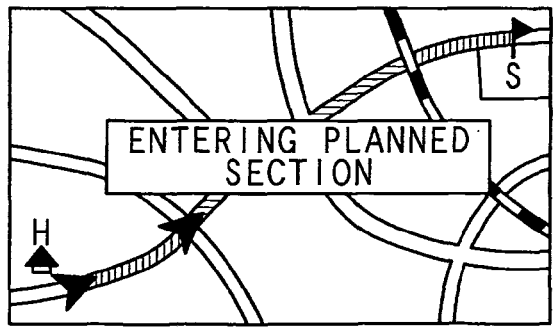
FIGS. 17A and 17B are illustrations of a screen used in the notification process in the embodiment.

When it is determined that the vehicle is inside the plan section (S600:YES), the entrance into the plan section is notified in S602. More practically, a notification screen as shown in FIG. 17A is displayed, notifying the occupant of the entrance into the plan section.

In this case, the determination result in S600 is set to NO if the current vehicle position is continuously being inside the plan section or continuously being outside the plan section. In other words, when the current vehicle position does not transit from outside of the plan section to inside of the plan section, the determination result in S600 is NO. Thus, in that case, the process proceeds directly to S604 without notification of the entrance in S602.

In S604, it is determined whether the vehicle has exited from the plan section to an outside of the plan section. More practically, the current determination result is compared with a previous determination result, for determining whether or not the current vehicle, position comes out of the plan section.

Figure 17B:
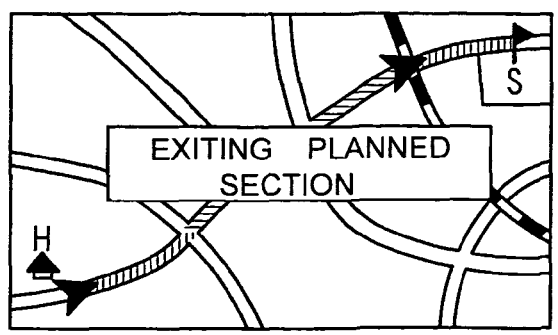

When the current vehicle position comes out of the plan section, the determination result of S604 becomes YES, thereby leading to the notification of the exit from the plan section in S606. More practically, a notification screen as shown in FIG. 17B is displayed, notifying the occupant of the exit from the plan section.

In this case, the determination result in S604 is set to NO if the current vehicle position is continuously being inside the plan section or continuously being outside the plan section. In other words, when the current vehicle position does not transit from an inside of the plan section to an outside of the plan section, the determination result in S604 is NO. Thus, in that case, the process concludes itself without notification of the exit in S606.

Figure 18:
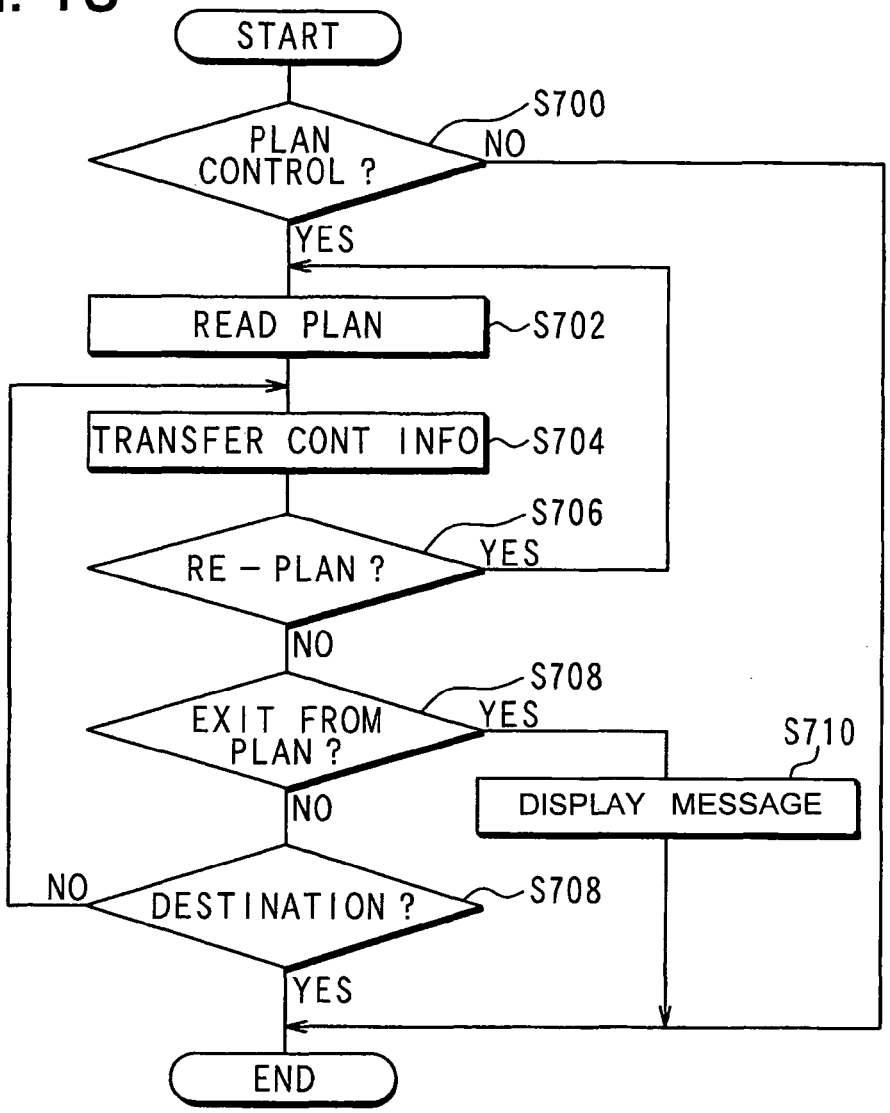
FIG. 18 is a flowchart of an HV control process in the embodiment.

According to FIG. 18, the HV control process is explained next. When a travel plan is created and is stored in the durable storage medium, the navigation ECU 20 carries out the process shown in FIG. 18.

First, it is determined whether or not the plan control is carried out (S700). More practically, the created travel plan is displayed on the screen of the display unit, and an inquiry for the occupant is made, which confirms whether or not to perform a drive control based on the created plan.

If, by the operation of the occupant, not to perform the drive control based on the created plan is confirmed (S700:NO), the HV control process is concluded.

If, on the other hand, performing the drive control based on the created plan is confirmed by the operation of the occupant (S700:YES), the travel plan is read from the durable storage medium (S702), and control information is transferred (S704). More practically, based on the current SOC notified from the HV controller 10 and the planned SOC for the current vehicle position in the SOC management plan, an instruction (i.e., the control information) for adjusting the charge amount of the battery 9 at the current vehicle position toward the planned OC for the current vehicle position is transferred to the HV controller 10.

Then, whether or not to re-plan the SOC. (i.e., to create a new SOC plan) is determined, based on whether or not the difference between the planned SOC and the current SOC is greater than a threshold (S706).

If the difference is smaller than the threshold (S706:NO), whether or not the exit from the plan section is then determined (S708). More practically, whether the current vehicle position is located on the plan section is determined, for the determination of exit from the plan section.

If the current vehicle position is located on the plan section (S708:NO), whether or not the vehicle has reached the destination is then determined (S712).

The determination in S712 continues to be set to NO until the vehicle reaches the destination, to return the process to S704, thereby repeating the above process.

If the difference between the planned SOC and the current SOC is greater than the threshold, the determination in S706 becomes YES, the travel plan creation process (S500) shown in FIG. 15 is performed again (not illustrated in FIG. 18), to return to S702. By performing the travel plan creation process again, a new travel plan is created, and the drive control based on the new travel plan will be performed.

Figure 19:
FIG. 19 is an illustration of a screen used in the HV control process in the embodiment.

If, based on the current vehicle position, the exit from the plan section is determined, that means the determination in S708 is set to YES, thus the drive control based on the travel plan is stopped, and the stopping of the drive control based on the travel plan is notified by a message on the screen (S710), to conclude the HV control process. The message of stopping the drive control may look like the example "EXIT FROM PLAN SECTION/PLAN CONTROL STOPPED" in FIG. 19.

Further, when the vehicle reaches the destination, the determination in S712 becomes YES, and the HV control process is concluded.

In summary, the following advantages are expected from the drive control apparatus of the present embodiment.

According to the operation scheme of the apparatus described above, the multiple plan sections are specified and stored in the storage medium, and the stored plan sections are displayed for allowing the occupant to select among them. Then, one of the multiple plan sections to be serving as an expected travel route selected by the occupant's operation is used to create a travel plan. In other words, the expected travel route is specified by the occupant of the vehicle, and the travel plan for the expected travel route is created.

Further, upon confirming by the occupant that at least one of the displayed plan sections matches the expected travel route, the matching plan section is specified as the expected travel route. In other words, the occupant can easily set the expected travel route according to displayed plan sections.

Further, upon confirming by the occupant that no plan section being displayed matches the expected travel route, the displayed plan section can be modified according to the operation of the occupant. That is, an occupant-modified plan section is specified as the expected travel route. In other words, the occupant can easily modify the displayed plan section for setting the expected travel route.

Further, upon confirming that an occupant-specified plan section in the map screen is used as the plan section of the travel plan, the occupant-specified plan section is specified as the plan section of the travel plan. In other words, the occupant can easily and arbitrarily set the plan section from the sections displayed on the map screen.

Further, upon confirming that an occupant-searched guidance route from the departure place to the destination is used as the plan section, the occupant-searched guidance route is set as the plan section of the travel plan.

Further, the modification of the searched route can be easily performed by the occupant after inquiring confirmation of such modification. Therefore, the occupant can modify the searched guidance route for setting the plan section of the travel plan.

Further, the travel locus of the vehicle is collected and accumulated for setting the plan section upon confirmation by the occupant. That is, the travel locus can be used as the plan section of the travel plan.

Further, the travel locus stored in the memory medium can be modified upon confirmation by the occupant. That is, the modified travel locus can be used to set the plan section of the travel plan.

Further, due to the notification from the apparatus when the exit of the vehicle from the plan section is detected, the occupant can easily notice that the vehicle has exited from the plan section.

Further, due to the notification from the apparatus when the entrance of the vehicle into the plan section is detected, the occupant can easily notice that the vehicle has entered the plan section.

Although the present disclosure has been fully described in connection with preferred embodiment thereof with reference to the accompanying drawings, it is to be noted that various changes and modifications will become apparent to those skilled in the art.

For example, in the above embodiment, the drive control based on the travel plan may be stopped, and stopping of the drive control based on the travel plan is displayed as a message in S710, and the HV control process is concluded, when it is determined that the vehicle has exited the plan section in S708. However, when it is determined that the vehicle has exited the plan section in S708, the travel plan creation process shown in FIG. 13 may be performed after stopping the travel-plan based drive control and displaying the stop message.

Further, in the above embodiment, the destination setting and the route search in S400 and S402 are performed with the determination if the searched route has been registered as the plan section in S404, for the purpose of allowing the occupant to set the expected travel route based on the searched route. However, for the purpose of setting the expected travel route, the plan section stored in the durable storage medium may be displayed for the occupant without the destination setting, the route search and the like.

Further, in the above embodiment, the plan sections are displayed in a list form as shown in FIG. 14A for allowing the occupant to select a plan section. However, the plan sections may be displayed on the map. Further, both of the list and the map may be displayed at the same time.

Further, in the above embodiment, after at least one of the departure place and the destination of the guidance route is modified by the occupant in S208, whether or not to set the modified route as the plan section is confirmed in S210. However, the displayed guidance route may be divided into multiple sections by the modification by the occupant in S208, and an occupant-selected section or sections from among the multiple sections may be set as the plan section after confirmation by the occupant in S210.

Further, in the above embodiment, after at least one of the departure place and the destination of the travel locus is modified by the occupant in S308, whether or not to set the modified travel locus as the plan section is confirmed in S310. However, the displayed travel locus may be divided into multiple sections by the modification by the occupant in S308, and an occupant-selected section or sections from among the multiple sections may be set as the plan section after confirmation by the occupant in S310.

Such changes, modifications, and summarized schemes are to be understood as being within the scope of the present disclosure as defined by appended claims.

The terms used in the present embodiment and the claim language may be associated with each other in the following fashion. That is, a plan section storage process 1 (S100 to S104); a plan section storage process 2 (S200 to S212) and a plan section storage process 3 (S300 to S312) are equivalent to a plan section storage. S400 to S412 are equivalent to a travel route presenter. S500 is equivalent a travel plan creator. S408 is equivalent to a confirmation unit. S412 is equivalent to a modification unit. S100 is equivalent to a plan section indicator. S102 is equivalent to a first inquiry unit. S202 is equivalent to a route search unit. S210 is equivalent to a second inquiry unit. S206 is equivalent to a modification inquiry unit. S208 is equivalent to a route modification unit. S310 is equivalent to a third inquiry unit. S306 is equivalent to a locus confirmation unit. S308 is equivalent to a locus modification unit. S604 is equivalent to an exit determination unit. S606 is equivalent to an exit notification unit. S600 is equivalent to an entrance determination unit. S602 is equivalent to an entrance notification unit.

What is claimed is:

1. A planning apparatus for creating a travel plan of a hybrid vehicle that uses an internal combustion engine and a motor as a driving power source and performs control on how to use the internal combustion engine and the motor according to the travel plan, the apparatus comprising:
   a plan section storage for specifying and storing each of a plurality of plan sections in the travel plan in a storage medium;
   a confirmation unit for presenting the plurality of plan sections in the travel plan stored in the storage medium on a display unit and for confirming whether a part of the plan sections less than all of the plan sections presented matches an expected travel route specified by an occupant;
   a travel route identification unit for identifying the plurality of plan sections in the travel plan as the expected travel route specified by the occupant, when the occupant confirms via the confirmation unit that the part of the plan sections less than all of the plan sections presented matches with the expected travel route; and
   a travel plan creator for creating the travel plan by employing the expected travel route specified by the occupant as the plurality of plan sections of the travel plan.

2. The planning apparatus of claim 1, further comprising:
   a modification unit for generating a modified plan section by modifying at least one of the plan sections presented according to the operation of the occupant when any portion of the plan sections presented does not match with the expected travel route confirmed by the confirmation unit, and the modified plan section according to the operation of the occupant is set as the expected travel route chosen by the occupant.

3. The planning apparatus of claim 1, wherein
the plan section storage includes:
a plan section indicator for having the occupant specify the plan section from a map; and
a first inquiry unit for inquiring whether or not to set the plan section specified by the plan section indicator as the plan section of the travel plan, wherein
the plan section storage stores the specified plan section specified as the plan section of the travel plan, when the occupant confirms, via the first inquiry unit the plan section specified as the plan section of the travel plan.

4. The planning apparatus of claim 1 further comprising:
a route search unit for searching a guidance route from a departure place to a destination according to the operation of the occupant; and
a second inquiry unit for inquiring of the occupant about whether or not to specify a searched guidance route searched by the route search unit as the plan section of the travel plan, wherein
the plan section storage stores the searched guidance route as the plan section of the travel plan when the searched guidance route is confirmed as the plan section of the travel plan by the second inquiry unit.

5. The planning apparatus of claim 4 further comprising:
a modification inquiry unit for inquiring of the occupant about a modification confirmation of the searched guidance route searched by the route search unit; and
a route modification unit for modifying the searched guidance route when the modification is confirmed by the modification inquiry unit, wherein
the plan section storage stores the modified guidance route modified by the route modification unit as the plan section of the travel plan.

6. The planning apparatus of claim 1 further comprising:
a third inquiry unit for collecting a travel locus during travels of the vehicle and for inquiring of the occupant about whether or not to specify a collected travel locus as the plan section of the travel plan, wherein
when the third inquiry unit confirms use of the collected travel locus as the plan section of the travel plan, the plan section storage stores the collected travel locus as the plan section of the travel plan.

7. The planning apparatus of claim 6 further comprising:
a locus confirmation unit for confirming modification of the travel locus stored in the storage medium; and
a locus modification unit for modifying the collected travel locus according to the operation of the occupant when modification of the travel locus is confirmed by the locus confirmation unit, wherein
the plan section storage stores the travel locus modified by the locus modification unit as the plan section of the travel plan.

8. The planning apparatus of claim 1 further comprising:
an exit determination unit for determining whether the vehicle has exited from the plan section to an outside of the plan section; and
an exit notification unit for notifying the occupant of the exit of the vehicle from the plan section when the exit is determined by the exit determination unit.

9. The planning apparatus of claim 1 further comprising:
an entrance determination unit for determining whether the vehicle has entered into the plan section from an outside of the plan section; and an entrance notification unit for notifying the occupant of the entrance of the vehicle into the plan section from the outside of the plan section when the entrance is determined by the entrance determination unit.

10. A planning apparatus for creating a travel plan of a hybrid vehicle that uses an internal combustion engine and a motor as a driving power source and performs control on hold to use the internal combustion and the motor according to the travel plan when the hybrid vehicle travels over a selected travel route, the apparatus comprising:
a plan section storage for specifying and storing a plurality of plan sections of a recommended travel route in a storage medium;
a confirmation unit for presenting the plurality of plan sections of the recommended travel route stored in the storage medium on a display unit and confirming whether the recommended travel route matches an expected travel route of an occupant;
a travel route identification unit for identifying the recommended travel route as the selected travel route when the occupant confirms via the confirmation unit that the recommended travel route matches the expected travel route; and
a travel plan creator for creating the travel plan using the selected travel route after the occupant confirms that the recommended travel route matches the expected travel route.

11. The planning apparatus of claim 10, further comprising:
a modification unit for generating a modified travel route different than the recommended travel route by modifying at least one of the plurality of plan sections of the recommended travel route when the at least one of the plurality of plan sections of the recommended travel route does not match the expected travel route; wherein
the travel route identification unit identifies the modified travel route as the selected route when the occupant modifies the at least one of the plurality of plan sections of the recommended travel route; and
the travel plan creator creates the travel plan using the selected travel route after the occupant modifies the at least one of the plurality of plan sections of the recommended travel route.

12. A planning apparatus for creating a travel plan of a hybrid vehicle that uses an internal combustion engine and a motor as a driving power source and performs control on how to use the internal combustion engine and the motor according to the travel plan, the apparatus comprising:
a plan section storage for specifying and storing each of a plurality of plan sections in the travel plan in a storage medium;
a confirmation unit for presenting the plurality of plan sections in the travel plan stored in the storage medium on a display unit and for confirming individually section by section whether at least a part of the plan sections presented matches an expected travel route specified by an occupant;
a travel route identification unit for identifying the plurality of plan sections in the travel plan as the expected travel route specified by the occupant, when the occupant confirms via the confirmation unit that at least the part of the plan sections presented matches with the expected travel route; and
a travel plan creator for creating the travel plan by employing the expected travel route specified by the occupant as the plurality of plan sections of the travel plan.

* * * * *